United States Patent
Le Duc et al.

(10) Patent No.: US 12,442,371 B2
(45) Date of Patent: Oct. 14, 2025

(54) BEARING ARRANGEMENT FOR PUMPS

(71) Applicant: Hamilton Sundstrand Corporation, Charlotte, NC (US)

(72) Inventors: Zachary Allen Ray Le Duc, Granby, CT (US); Edward W. Goy, Crystal Lake, IL (US); Joseph Wetch, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 63 days.

(21) Appl. No.: 18/238,919

(22) Filed: Aug. 28, 2023

(65) Prior Publication Data

US 2025/0075699 A1   Mar. 6, 2025

(51) Int. Cl.
F04C 15/00 (2006.01)
F04C 2/344 (2006.01)

(52) U.S. Cl.
CPC .............. F04C 15/00 (2013.01); F04C 2/344 (2013.01); *F04C 2240/50* (2013.01)

(58) Field of Classification Search
CPC .......... F04C 2/344; F04C 14/20; F04C 14/22; F04C 14/223; F04C 14/226; F04C 15/00; F04C 15/0061; F04C 15/0065; F04C 15/0057; F04C 15/0073; F04C 2240/50; F04C 2240/56; F04C 2240/60; F04C 2240/605

See application file for complete search history.

(56) References Cited

U.S. PATENT DOCUMENTS

| 1,233,426 A | 7/1917 | Webber |
| 2,590,761 A | 3/1952 | Edgar |
| 2,635,552 A | 4/1953 | Dale et al. |
| 3,659,911 A | 5/1972 | Kessler et al. |
| 5,833,438 A * | 11/1998 | Sundberg ............ F04C 15/0023 418/133 |

(Continued)

FOREIGN PATENT DOCUMENTS

| DE | 102013218758 A1 | 3/2015 |
| EP | 3290711 A1 | 3/2018 |
| WO | 2020217066 A1 | 10/2020 |

OTHER PUBLICATIONS

DE 102013218758 A1—Cholewa et al.—Gear Machine With Non-cylindrical Bearing Bore—Mar. 19, 2015—the English Machine Transaltion. (Year: 2015).*

(Continued)

*Primary Examiner* — Essama Omgba
(74) *Attorney, Agent, or Firm* — Kinney & Lange, P.A.

(57) ABSTRACT

In accordance with at least one aspect of this disclosure, a pump comprises a pump rotor having a plurality of vanes therein configured to pump a fluid from a pump inlet to a pump outlet through rotation of the rotor about a rotational axis, an input shaft operatively connected to drive rotation of the rotor, and a bearing operatively connected to the input shaft configured to facilitate rotation of the input shaft. A shaft extender is operatively connected radially between the input shaft and the bearing. The input shaft includes a conical portion and the shaft extender includes a conical portion complementary to the conical portion of the input shaft. The shaft extender interfaces with at least the conical portion of the input shaft, when on the input shaft.

14 Claims, 1 Drawing Sheet

(56) References Cited

U.S. PATENT DOCUMENTS

| | | |
|---|---|---|
| 10,502,259 B2 | 12/2019 | Meyer |
| 2004/0253134 A1* | 12/2004 | Bohr .................... F04C 2/3441 |
| | | 418/259 |
| 2022/0341464 A1 | 10/2022 | Fukuzawa et al. |

OTHER PUBLICATIONS

Extended European Search Report dated Nov. 14, 2024, for corresponding European Patent Application No. 24197062.3, 9 pgs.

* cited by examiner

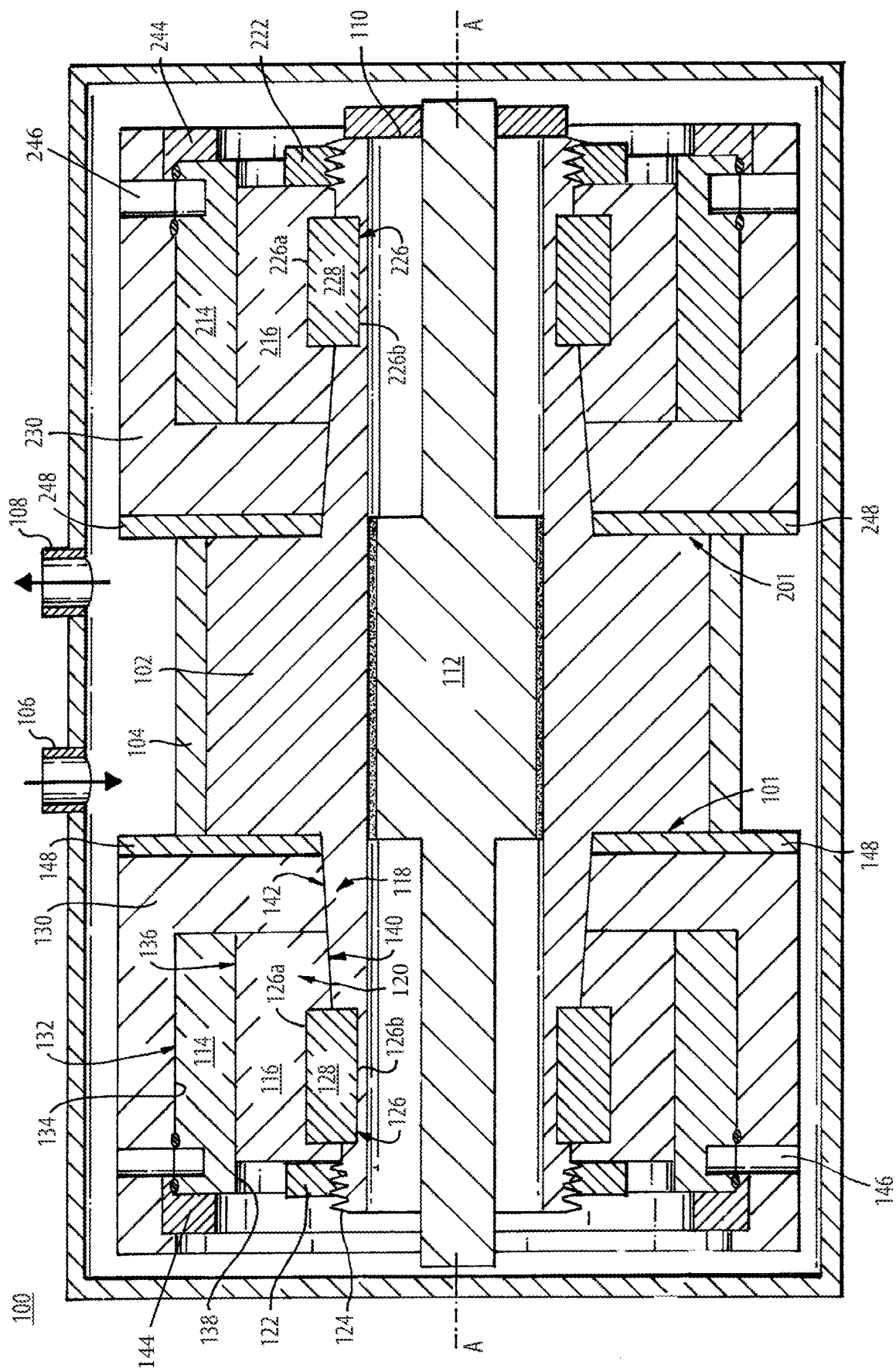

BEARING ARRANGEMENT FOR PUMPS

TECHNICAL FIELD

The present disclosure relates to pumps and more particularly to bearing arrangements for pumps.

BACKGROUND

Certain pumps, e.g., variable displacement vane pumps have high hydraulic loads that must be reacted into one or more bearings. A typical configuration has two bearings, one on each side of the rotor. Because of the high hydraulic radial loading, these types of pumps are limited to low pressure rise, low displacement applications that have lower hydraulic loads. While it may be possible to use larger bearings to carry more load, such bearings may be limited by the diameter of the shaft/bearings. In certain pumps, the diameter of the bearings may be limited by the rotor vane slots since they cannot be manufactured without a tool path that moves axially through the rotor. Thus, larger bearings may not be suitable for every application.

The conventional techniques have been considered satisfactory for their intended purpose. However, there is an ever present need for improved systems and methods for improved bearing arrangements for such pumps. This disclosure provides a solution for this need.

SUMMARY

In accordance with at least one aspect of this disclosure, a pump comprises a pump rotor having a plurality of vanes therein configured to pump a fluid from a pump inlet to a pump outlet through rotation of the rotor about a rotational axis, an input shaft operatively connected to drive rotation of the rotor, and a bearing operatively connected to the input shaft configured to facilitate rotation of the input shaft. A shaft extender is operatively connected radially between the input shaft and the bearing. The input shaft includes a conical portion and the shaft extender includes a conical portion complementary to the conical portion of the input shaft. The shaft extender interfaces with at least the conical portion of the input shaft, when on the input shaft.

A retaining nut can be disposed on the input shaft to axially retain the shaft extender on the input shaft. In embodiments, the retaining nut can include a set of threads configured to engage a set of threads on the input shaft. The set of threads can engage in a direction opposite the direction of rotation of the shaft, to prevent disengagement of the threads during rotation of the shaft.

In embodiments, the shaft extender can include a first key slot portion and the input shaft can include a second key slot portion axially aligned with the first key slot portion to form a single key slot configured to accept a key to ensure the shaft extender and the input shaft rotate together. In certain such embodiments, the pump can include the key disposed in the key slot.

In embodiments, an end cap can be disposed on the input shaft configured to partially enclose the bearing and the shaft extender. An outer diameter of the bearing can be configured to interface an inner diameter of the end cap. An outer diameter of the shaft extender can be configured to interface an inner diameter of the bearing. An inner diameter of the shaft extender can be configured to interface an outer diameter of the input shaft. Each of the bearing and the shaft extender can be radially within the end cap. A bearing retainer can be disposed axially outboard of the bearing configured to axially retain the bearing within the end cap.

In embodiments, the bearing and the shaft extender can be a first bearing and a first shaft extender disposed on in the input shaft on a first side of the rotor. The pump can include a second bearing and a second shaft extender disposed on a the input shaft on a second side of the rotor, the second shaft extender radially between the second bearing and the input shaft.

The second shaft extender can include a first key slot portion and the input shaft can include a second key slot portion axially aligned with the first key slot portion of the second shaft extender to form a single second key slot configured to accept a second key to ensure the shaft extender and the input shaft rotate together. In embodiments, the pump can include the second key disposed in the second key slot.

The end cap can be a first end cap disposed on the first side of the rotor, and the pump can include a second end cap disposed on the input shaft on the second side of the configured to partially enclose the second bearing and the second shaft extender. An outer diameter of the second bearing can be configured to interface an inner diameter of the second end cap. An outer diameter of the second shaft extender can be configured to interface an inner diameter of the second bearing. An inner diameter of the second shaft extender can be configured to interface an outer diameter of the input shaft. The second bearing and the second shaft extender can be radially within the second end cap. A second retainer can be disposed axially outboard of the bearing configured to retain the bearing within the end cap.

In embodiments, the pump can include a first sealed bearing and a second sealed bearing, the first sealed bearing disposed in the first end cap and the first bearing, and the second sealed bearing disposed in the second end cap and the second bearing. In embodiments, the pump can include a first port plate disposed axially between the first side of the rotor and the first end cap and a second port plate disposed axially between the second side of the rotor and the second end cap.

In embodiments, the input shaft can be a hollow shaft and the bearing can be a journal bearing. In embodiments, the pump can be a pressure balanced vane pump. In embodiments, the pump can be a variable displacement vane pump.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain FIGURES, wherein:

FIG. 1 is a schematic cross sectional view of a pump in accordance with this disclosure, showing an arrangement of components within the pump, including a bearing, a shaft, and a shaft extender.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a pump in accordance with the disclosure is shown in FIG. 1 and is designated generally by reference character 100.

In accordance with at least one aspect of this disclosure, a pump 100 comprises a pump rotor 102 having a plurality of vanes 104 therein configured to pump a fluid from a pump inlet 106 to a pump outlet 108 through rotation of the rotor 102 about a rotational axis A. An input shaft 110 is operatively connected to drive rotation of the rotor 102. In embodiments, the input shaft 110 can be a hollow shaft (e.g., as shown) and having a shaft drive 112 therein. In embodiments, the pump 100 can be a pressure balanced vane pump and/or a variable displacement vane pump.

A bearing 114 (e.g., a journal bearing) can be operatively connected to the input shaft 110 to facilitate rotation of the input shaft. A shaft extender 116 is operatively connected radially between the input shaft 110 and the bearing 114. The input shaft 110 includes a conical portion 118 and the shaft extender 116 includes a conical portion 120 complementary to the conical portion 118 of the input shaft 110. The shaft extender 116 is disposed on the input shaft 110 and interfaces with at least the conical portion 118 of the input shaft 110, when the shaft extender 116 is installed on the input shaft 110.

A retaining nut 122 can be disposed on the input shaft 110 to axially retain the shaft extender 116 on the input shaft 110. In embodiments, the retaining nut 122 can include a set of threads 124 configured to engage a set of threads on the input shaft 110. The set of threads 124 can engage in a direction opposite the direction of rotation of the input shaft 110, to prevent disengagement of the threads 124 during rotation of the input shaft 110.

In embodiments, the shaft extender 116 can include a first key slot portion 126a and the input shaft 110 can include a second key slot portion 126b axially aligned with the first key slot portion 126a to form a single key slot 126 configured to accept a key 128. The key 128 will create a tight fit of the shaft extender 116 between the input shaft 110 to ensure the input shaft 110 and the shaft extender 116 continue to rotate together in the event the shaft extender 116 loosens (e.g., an event where the retaining nut 122 comes loose such that the shaft extender 116 is no longer engaged with the shaft 110). In such an event, the key 128 will engage both the shaft extender 116 and the shaft 110 to ensure both rotate together. The key slots 126 and key 128 can be located along the shaft at any suitable axial location.

An end cap 130 can be disposed on the input shaft 110 configured to partially enclose the bearing 114 and the shaft extender 116. For example, the end cap 130 can radially enclose the bearing 114 and shaft extender 116, but may not axially enclose the bearing 114 and shaft extender 116. When assembled into the pump 100, an outer diameter 132 of the bearing 114 can interface an inner diameter 134 of the end cap 130, an outer diameter 136 of the shaft extender 116 can interface an inner diameter 138 of the bearing 114, and an inner diameter 140 of the shaft extender 116 can interface an outer diameter 142 of the input shaft 110. Each of the bearing 114 and the shaft extender 116 can be radially within the end cap 130, as shown. A bearing retainer 144 can be disposed axially outboard of the bearing 114 configured to axially retain the bearing 114 within the end cap 130.

As shown, the bearing 114, the shaft extender 116, the retaining nut 122, the end cap 130 and the retainer 144 can all be disposed on in the input shaft 110 on a first side 101 of the rotor 102. The pump 100 can include a second bearing 214, a second shaft extender 216, a second retaining nut 222, a second end cap 230 and a second bearing retainer 244 arranged on the second side 201 of the rotor 102 in the same manner as described with respect to the first components on the first side 101 of the rotor 102, including key slot portions 226a, 226b, key slot 226, and key 228.

In embodiments, the pump 100 can include a first sealed bearing 146 and a second sealed bearing 246, the first sealed 146 bearing disposed in the first end cap 130 and the first bearing 114, and the second sealed bearing 246 disposed in the second end cap 230 and the second bearing 214. A first port plate 148 can be included axially between the first side 101 of the rotor 102 and the first end cap 130 and a second port plate 248 can be included axially between the second side 201 of the rotor 102 and the second end cap 230.

Embodiments include a journal bearing shaft extender that can be attached to the input shaft after manufacturing the rotor vane slots. The journal bearing shaft extender can be fit onto a standard rotor shaft and having a conical shape that matches a conical shape machined into the rotor shaft. The corresponding conical shapes act as a wedge to create a tight fit with minimal radial play. Then the journal bearing shaft extender can be retained with a nut with threads opposite the direction of rotation and with crush threads. FIG. 1 shows a cross section of the configuration as described herein. Additionally, a key can be included to act as a secondary driving method for the shaft extender in the event the shaft extender and the rotor shaft lose a tight fit. This ensures the extender and the shaft can still rotate together if the conical fit loosens without failing the pump. Four keys are shown, however any suitable number of keys is contemplated herein, for example, one key on each side of the rotor. Embodiments can be suitable for a hollow shaft with journal bearings, which can be retained on the shaft with a nut. Embodiments allow for conventional input shafts and rotors to be used for pumps with increased radial loads, while modifying the end caps and bearings to allow for room for the shaft extenders, which can adequately react to the increased load.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A pump, comprising:
a pump rotor having a plurality of vanes therein configured to pump a fluid from a pump inlet to a pump outlet through rotation of the rotor about a rotational axis;
an input shaft operatively connected to drive rotation of the rotor;
a bearing operatively connected to the input shaft configured to facilitate rotation of the input shaft;
a shaft extender operatively connected radially between the input shaft and the bearing,
wherein the input shaft includes a conical portion and wherein the shaft extender includes a conical portion complementary to the conical portion of the input shaft, wherein the shaft extender interfaces with at least the conical portion of the input shaft;
wherein the bearing and the shaft extender are a first bearing and a first shaft extender disposed on the input shaft on a first side of the rotor, and further comprising, a second bearing and a second shaft extender disposed on the input shaft on a second side of the rotor, the second shaft extender radially between the second bearing and the input shaft;
wherein the second shaft extender further includes a third key slot portion and the input shaft includes a fourth key slot portion axially aligned with the third key slot portion of the second shaft extender to form a single second key slot configured to accept a second key to ensure the shaft extender and the input shaft rotate together;
wherein the second key is disposed in the single second key slot;
wherein an end cap is a first end cap disposed on the first side of the rotor, further comprising a second end cap disposed on the input shaft on the second side of the rotor configured to partially enclose the second bearing and the second shaft extender, wherein an outer diameter of the second bearing is configured to interface an inner diameter of the second end cap, an outer diameter of the second shaft extender is configured to interface an inner diameter of the second bearing, and an inner diameter of the second shaft extender is configured to interface an outer diameter of the input shaft, all within the second end cap;
wherein a retainer is a first retainer, and further comprising a second retainer disposed axially outboard of the second bearing configured to retain the second bearing within the second end cap;
a first sealed bearing and a second sealed bearing, the first sealed bearing disposed in the first end cap and the first bearing, and the second sealed bearing disposed in the second end cap and the second bearing; and
a first port plate disposed axially between the first side of the rotor and the first end cap and a second port plate disposed axially between the second side of the rotor and the second end cap.

2. The pump of claim 1, further comprising, a first retaining nut disposed on the input shaft to axially retain the first shaft extender on the input shaft.

3. The pump of claim 2, wherein the first retaining nut includes a set of threads configured to engage a set of threads on the input shaft, wherein the set of threads engage in a direction opposite the direction of rotation of the input shaft.

4. The pump of claim 1, wherein the first shaft extender further includes a first key slot portion and the input shaft includes a second key slot portion axially aligned with the first key slot portion to form a single key slot configured to accept a key to ensure the shaft extender and the input shaft rotate together.

5. The pump of claim 4, further comprising the key disposed in the single key slot.

6. The pump of claim 5, wherein the first an end cap is disposed on the input shaft and is configured to partially enclose the first bearing and the first shaft extender, wherein an outer diameter of the first bearing is configured to interface an inner diameter of the first end cap, an outer diameter of the first shaft extender is configured to interface an inner diameter of the first bearing, and an inner diameter of the first shaft extender is configured to interface an outer diameter of the input shaft, all within the first end cap.

7. The pump of claim 6, wherein the first retainer is disposed axially outboard of the first bearing and is configured to axially retain the first bearing within the end cap.

8. The pump of claim 1, wherein the input shaft is a hollow shaft and the first bearing and the second bearing are journal bearings.

9. A pump, comprising:
a pump rotor having a plurality of vanes therein configured to pump a fluid from a pump inlet to a pump outlet through rotation of the rotor about a rotational axis;
an input shaft operatively connected to drive rotation of the rotor;
a bearing operatively connected to the input shaft configured to facilitate rotation of the input shaft;
a shaft extender operatively connected radially between the input shaft and the bearing;
an end cap disposed on the input shaft configured to partially enclose the bearing and the shaft extender, wherein an outer diameter of the bearing is configured to interface an inner diameter of the end cap, an outer diameter of the shaft extender is configured to interface an inner diameter of the bearing, and an inner diameter of the shaft extender is configured to interface an outer diameter of the input shaft, all within the end cap;

a retainer disposed axially outboard of the bearing configured to axially retain the bearing within the end cap;

wherein the input shaft includes a conical portion and wherein the shaft extender includes a conical portion complementary to the conical portion of the input shaft, wherein the shaft extender interfaces with at least the conical portion of the input shaft;

wherein the shaft extender further includes a first key slot portion and the input shaft includes a second key slot portion axially aligned with the first key slot portion to form a single key slot configured to accept a key to ensure the shaft extender and the input shaft rotate together, further comprising the key disposed in the single key slot; and wherein the bearing and the shaft extender are a first bearing and a first shaft extender disposed on the input shaft on a first side of the rotor, and further comprising, a second bearing and a second shaft extender disposed on the input shaft on a second side of the rotor, the second shaft extender radially between the second bearing and the input shaft.

10. The pump of claim 9, wherein the second shaft extender further includes a first key slot portion and the input shaft includes a second key slot portion axially aligned with the first key slot portion of the second shaft extender to form a single second key slot configured to accept a second key to ensure the shaft extender and the input shaft rotate together.

11. The pump of claim 10, further comprising the second key disposed in the single second key slot.

12. The pump of claim 11, wherein the end cap is a first end cap disposed on the first side of the rotor, further comprising a second end cap disposed on the input shaft on the second side of the configured to partially enclose the second bearing and the second shaft extender, wherein an outer diameter of the second bearing is configured to interface an inner diameter of the second end cap, an outer diameter of the second shaft extender is configured to interface an inner diameter of the second bearing, and an inner diameter of the second shaft extender is configured to interface an outer diameter of the input shaft, all within the second end cap.

13. The pump of claim 12, wherein the retainer is a first retainer, and further comprising a second retainer disposed axially outboard of the second bearing configured to retain the second bearing within the second end cap.

14. The pump of claim 13, further comprising a first sealed bearing and a second sealed bearing, the first sealed bearing disposed in the first end cap and the first bearing, and the second sealed bearing disposed in the second end cap and the second bearing.

* * * * *